No. 891,517. PATENTED JUNE 23, 1908.
H. L. ALLEN.
DUMPING APPARATUS.
APPLICATION FILED SEPT. 3, 1907.
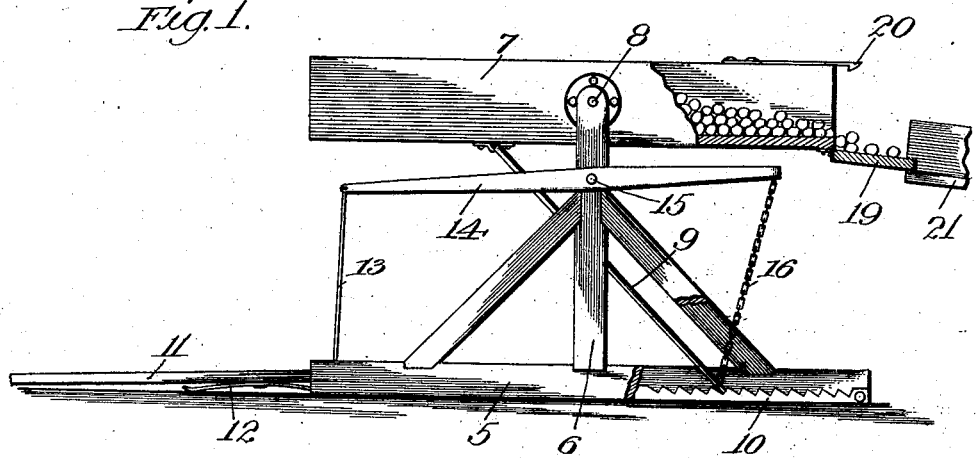
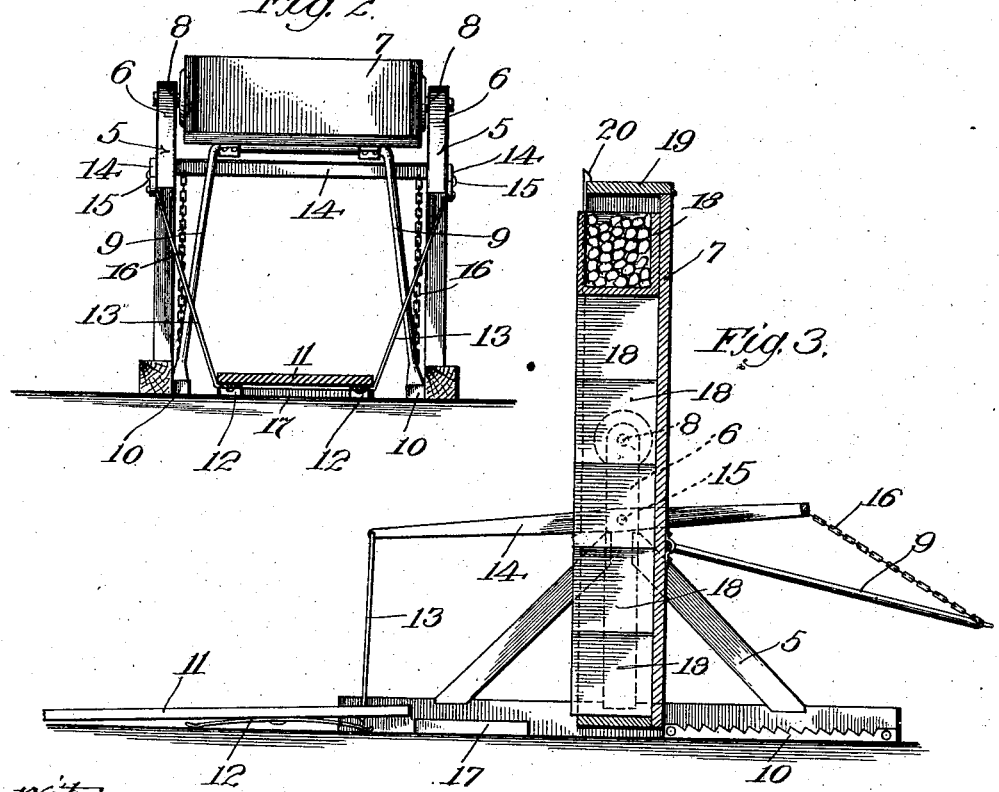
Witnesses:
Inventor:
Horace L. Allen
By
Attorneys

UNITED STATES PATENT OFFICE.

HORACE L. ALLEN, OF LOS ANGELES, CALIFORNIA.

DUMPING APPARATUS.

No. 891,517.	Specification of Letters Patent.	Patented June 23, 1908.

Application filed September 3, 1907. Serial No. 391,119.

*To all whom it may concern:*

Be it known that I, HORACE L. ALLEN, a citizen of the United States, residing at Los Angeles, county of Los Angeles, and State of California, have invented new and useful Improvements in Dumping Apparatus, of which the following is a specification.

My invention relates to a dumping apparatus for fruit or the like and the object thereof is to provide an apparatus which will deliver fruit to grading and brushing machines without subjecting the same to rough handling which might bruise and injure it.

A further object is to provide an apparatus which automatically places itself in a position such that the fruit may be easily placed therein preparatory to delivery therefrom.

I accomplish these objects by means of the device described herein and illustrated in the accompanying drawing, in which:—

Figure 1.—is a side elevation of my improved dumping apparatus, parts being broken away for purposes of illustration. Fig. 2.—is an end elevation of the same. Fig. 3.—is a sectional view showing the apparatus in its loaded position.

In the drawings 5 designates upright frames whose standards 6 are adapted to pivotally carry a box 7, the box being provided with trunnions 8 which are journaled in the upper end of standards 6. As illustrated in the drawings box 7 is longer and heavier on the left of the trunnions than on the right so that in the absence of any support the box tends to assume the position shown in Fig. 3. To the under side of the box is pivotally secured an inverted U shaped frame 9 whose lower extremities are adapted to contact with and engage ratchet racks 10 secured to the inner faces of frames 5. As shown in Fig. 1 frame 9 supports box 7 in its horizontal position until its lower ends are removed from engagement with rack 10.

Directly in front of the apparatus and extending between frames 5 is a run board 11 whose end is supported by flat springs 12. The inner end of run board 11 is connected by rod 13 to the ends of a U shaped lever 14 pivoted at 15 to frames 5. The other end of lever 14 is connected by chains 16 to the bottom ends of U shaped frame 9. By means of this arrangement frame 9 is lifted out of engagement with rack 10 whenever the end of run board 11 is depressed by any weight being placed thereon.

Assuming an initial position as shown in Fig. 1 the operation of my device is as follows:—
A hand truck loaded with boxes of fruit is run up to the dumping apparatus over run board 11, thereby depressing the end of the board and releasing the box to fall into the position shown in Fig. 3. The truck is then moved inwardly onto stationary extension 17 of run board 11 and the boxes of fruit 18 are tipped over into box 7 as shown in Fig. 3, the open tops of the boxes being upwards just as they are piled in the truck. Box 7 is then tipped back to its original position by a manual operation so that the boxes rest on their sides and the boxes are then turned over by hand to a position with their tops lowermost so as to pour the fruit therefrom into box 7. End gate 19, which is normally held in its closed position by spring catch 20, is then lowered onto chute 21 which leads to the machine into which the fruit is wished to be run and the fruit is worked out by hand onto the chute. When all the fruit has been removed from the box end gate 19 is again closed and the next load of fruit moved up onto run board 11 when the whole operation is repeated.

It will be observed that my dumping apparatus is of great utility in moving the fruit from the truck on which it is brought to the grading and brushing machines to a position where it may be easily moved into such machine without any injury thereto. The fruit is usually stacked in the packing houses in piles of open boxes so that the boxes may be readily placed upon or grasped by a hand truck.

My device enables the boxes to be easily discharged from the hand truck and then to be raised to a position where the fruit may be readily poured from the boxes. This arrangement does away with the usual rough handling which fruit receives on being removed from the trucks to the chutes leading to the grading and brushing machines.

Having described my invention what I claim as new and desire to secure by Letters Patent is:—

1. In an apparatus of the class described the combination of a pivoted box with a resiliently supported run board, means to support said box in a horizontal position, and means to release said supporting means when the run board is depressed.

2. In an apparatus of the class described, a frame, a box pivotally mounted on said frame, means to support said box in a horizontal position, a spring supported run board located adjacent said frame, and connecting means between said run board and said supporting means whereby said supporting means is released upon the depression of the run board.

3. In an apparatus of the class described, a frame, a box pivotally mounted on said frame, said pivot being located apart from the center of gravity of said box, ratchet means to hold said box in a horizontal position, a spring supported run board located adjacent to said frame, and connecting means between said run board and said box supporting means whereby said supporting means is released upon the depression of said run board.

4. In a device of the class described, a frame, a box pivotally mounted on said frame, one end of said box being closed by a hinged door, a supporting frame pivotally secured to the under side of said box, racks secured to said first named frame and with which said supporting frame is adapted to engage, a resiliently supported run board located adjacent to said first named frame, and connecting means between said run board and said supporting frame whereby said supporting frame is removed from engagement with said racks upon the depression of said run board.

In witness that I claim the foregoing I have hereunto subscribed my name this 21st day of August, 1907.

HORACE L. ALLEN.

Witnesses:
JOHN HERRING,
H. E. BOSTON.